(12) United States Patent
Dolfi

(10) Patent No.: US 7,630,632 B2
(45) Date of Patent: Dec. 8, 2009

(54) METHOD FOR MEASURING THE HIGH SPEED BEHAVIOR OF FIBER OPTIC TRANSCEIVERS

(75) Inventor: David W. Dolfi, Los Altos, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 545 days.

(21) Appl. No.: 11/612,550

(22) Filed: Dec. 19, 2006

(65) Prior Publication Data

US 2008/0145059 A1    Jun. 19, 2008

(51) Int. Cl.
    *H04B 10/24*    (2006.01)
(52) U.S. Cl. .......................... 398/22; 702/122
(58) Field of Classification Search .............. 398/22
    See application file for complete search history.

(56) References Cited

U.S. PATENT DOCUMENTS

2005/0025449 A1 *  2/2005  Dirkson et al. ............ 385/147
2007/0113119 A1 *  5/2007  Hafed et al. ............... 714/700

* cited by examiner

*Primary Examiner*—Leslie Pascal

(57) ABSTRACT

A method for measuring the high speed behavior of fiber optic transceivers and transceiver modules. The method includes providing a fiber optic transceiver, performing one or more low speed performance tests on the fiber optic transceiver at each of a plurality of temperatures across transceiver operating temperature range, and performing a high speed performance test suite on the fiber optic transceiver at a single temperature within the testing temperature range. Based on the low speed performance tests and the high speed performance test suite at the single temperature, the method can determine, via calculation, approximation or prediction, the high speed behavior of the transceiver over temperature. The basis for determining the high speed behavior of the transceiver also can include the measured or available modeled relationships of high speed performance characteristics of at least a portion of the transceiver to the temperature-dependent parameters measured in the low speed performance tests.

13 Claims, 3 Drawing Sheets

METHOD FOR MEASURING THE HIGH SPEED BEHAVIOR OF FIBER OPTIC TRANSCEIVERS

BACKGROUND OF THE INVENTION

1. Field of the Invention

The invention relates to testing for fiber optic transceivers. More particularly, the invention relates to determining the high speed performance or behavior of fiber optic transceivers and transceiver modules.

2. Description of the Related Art

Fiber optic transceivers and fiber optic transceiver modules are devices that both transmit and receive optical signals. During the process of fabricating fiber optic transceivers, when fiber optic transceivers are assembled and tested, a relatively large amount of time is spent characterizing the high speed behavior or high speed performance of the transceiver over an extended range of transceiver operating temperatures. That is, testing the transceiver to confirm whether its high speed performance characteristics are acceptable over the likely range of transceiver operating temperatures typically requires a relatively large amount of time compared to the overall time for transceiver fabrication, assembly and other testing.

Conventionally, the transceiver module initially is heated to a particular testing temperature, typically within a range of typical transceiver operating temperatures. The transceiver module then must be given sufficient time to stabilize at that initial temperature. The transceiver then is subjected to a series or suite of high speed performance tests to measure its high speed behavior or performance characteristics. Such high speed tests include Bit Error Ratio (BER) tests under a number of different input signal conditions, such as adding jitter and adding drive current. Another high speed test is a small signal frequency response test under a number of different input signal conditions. Typically, each high speed test requires a different set-up procedure, often involving different test equipment. After the suite of high speed tests are performed at the initial temperature, the transceiver module is heated to a different temperature, the transceiver is allowed to stabilize at the new testing temperature, and the suite of high speed tests are repeated at the new testing temperature.

Since transceivers typically are tested at several different temperatures over the range of transceiver operating temperatures, the overall testing procedure typically is relatively time consuming. For example, it takes a relatively long time to heat the transceiver module to each of several different testing temperatures and to allow the transceiver to stabilize at the given testing temperature. Moreover, the time required to perform each of the suite of high speed tests at each different temperature adds to the overall testing time. The relatively long period of time required to determine the high speed behavior of fiber optic transceivers adversely affects the production rate, and ultimately the cost, of the transceiver modules.

SUMMARY OF THE INVENTION

The methods described herein involve performance testing of fiber optic transceivers and transceiver modules to determine their high speed performance or behavior across a range of transceiver operating temperatures. The methods include providing a fiber optic transceiver, performing one or more low speed performance tests on the fiber optic transceiver at each of a plurality of temperatures over the range of transceiver operating temperatures, and performing a high speed performance test suite on the fiber optic transceiver at a single temperature within the testing temperature range. Based on the plurality of low speed performance tests and the high speed performance test suite at the single temperature, the method can determine, via calculation, approximation or prediction, the high speed behavior of the transceiver over temperature. The basis for determining the high speed behavior of the transceiver also can include the measured or available modeled relationships of high speed performance characteristics of at least a portion of the transceiver to the temperature-dependent parameters measured in the low speed performance tests. The inventive methods eliminate the need to perform relatively large numbers of high speed measurements at each of several different temperatures. Accordingly, the inventive methods provide relatively substantial cost savings in terms of reduced production time and needed test equipment.

DETAILED DESCRIPTION

Figure 1:
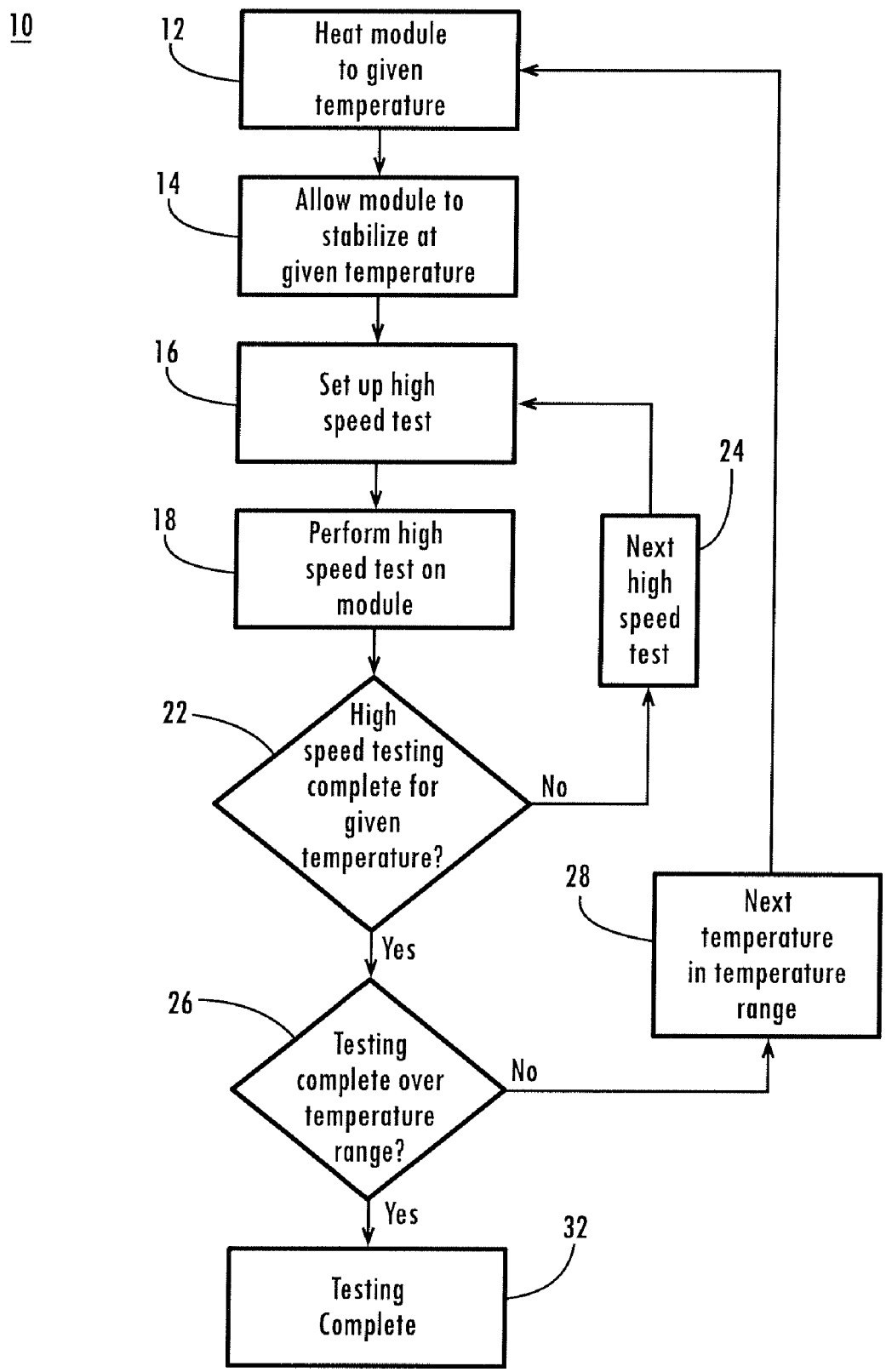
FIG. 1 is a flow chart that schematically illustrates a method for measuring the high speed performance of fiber optic transceivers and transceiver modules.

In the following description, like reference numerals indicate like components to enhance the understanding of the methods for measuring the high speed behavior or performance of fiber optic transceivers and transceiver modules. Also, although specific features, configurations and arrangements are discussed hereinbelow, it should be understood that such specificity is for illustrative purposes only. A person skilled in the relevant art will recognize that other steps, configurations and arrangements are useful without departing from the spirit and scope of the invention.

The methods described herein involve performance testing of fiber optic transceivers and transceiver modules. The inventive testing methods make use of the fact that the overall high speed behavior over temperature of many if not most fiber optic transceiver modules is dominated by the high speed behavior over temperature of one or two key components, such as the semiconductor laser that is used as the optical source in the transceiver. Also, the inventive testing methods make use of the fact that the high speed behavior over temperature of many of these key components can be determined from test measurements made at lower speeds, including direct current (DC) measurements, using relatively simpler tests with faster set-ups. The inventive methods combine the simpler, faster low speed performance tests over a range of temperatures with a single high speed performance test at a single temperature to calculate or approximate the high speed behavior of the fiber optic transceiver over the range of transceiver operating temperatures. The methods also can make use of measured or available modeled relationships of high speed performance characteristics of at least a portion of the transceiver to the temperature-dependent parameters measured in the low speed performance tests. In this manner, the inventive methods eliminate the need to perform a relatively large number of high speed performance tests at each of several different temperatures. Also, although the inventive methods may not be as accurate as conventional methods that perform a full suite of high speed performance tests at each of several different temperatures across a temperature range, the inventive methods often can meet or exceed the specification requirements of transceiver customers. Moreover, the inventive methods also provide a relatively substantial cost savings, e.g., in terms of reduced transceiver production time and test equipment.

Referring now to FIG. 1, shown is a flow chart that schematically illustrates a conventional method 10 for measuring the high speed behavior or performance of fiber optic transceivers and transceiver modules. The high speed behavior or performance of a fiber optic transceiver typically involves determining or characterizing the performance, such as the bit error ratio (BER) or frequency response, of a fiber optic transceiver for a given range of operating temperatures. In general, the high speed behavior or performance of the transceiver generally refers to how well the transceiver performs when the input test signal is transmitted to the transceiver at a relatively high speed data rate. To determine the performance characteristics of the fiber optic transceiver, a plurality of high speed performance tests are performed at each of a number of temperatures across the likely range of operating temperatures for the transceiver.

The method 10 includes a step 12 of heating the fiber optic transceiver to a first temperature within the range of operating temperatures for the transceiver, e.g., the lower limit or close to the lower limit of the desired range of operating temperatures. For example, for an operating temperature range of 0 to 80 degrees Celsius (° C.), the step 12 initially heats the fiber optic transceiver to a temperature near approximately 0° C. The method 10 also includes a step 14 of allowing the heated fiber optic transceiver to stabilize at the initial temperature established by the heating step 12. That is, once the fiber optic transceiver is heated to the initial temperature, the fiber optic transceiver is given a sufficient amount of time to stabilize so that subsequent test results will not be affected or will be minimally affected by instability on the part of the fiber optic transceiver.

The method 10 also includes a step 16 of setting up the first of a suite of high speed performance tests for the fiber optic transceiver. There are several high speed performance tests that can be performed on the fiber optic transceiver to measure the high speed behavior or performance of the fiber optic transceiver. For example, measuring the bit error ratio (BER) of the transceiver is one way to characterize the high speed performance of the transceiver. The BER test typically measures the number of error bits received by the fiber optic transceiver compared to the total number of bits received by the transceiver. The BER test can be performed under a number of different input data signal conditions. For example, the transceiver bit error ratio can be measured as different amounts of jitter are added to the input data signal. Also, the transceiver's performance under different drive current conditions can be measured as part of the suite of high speed performance tests. Another high speed performance test for measuring the high speed behavior of a fiber optic transceiver is a frequency response test, such as a small signal frequency response test. Such test measures the frequency response of the fiber optic transceiver at relatively low operating frequencies.

The method 10 also includes a step 18 of performing the initial high speed test on the fiber optic transceiver. Once the initial high speed test is performed, the method 10 performs a step 22 of determining whether all of the high speed testing is complete for the current testing temperature. As discussed hereinabove, conventional methods for measuring or determining the temperature behavior of fiber optic transceivers typically involve performing several high speed tests at each of a number of different temperatures over a range of testing temperatures.

Therefore, once the initial high speed test is performed, the method 10 will move to another high speed test to be performed at the current testing temperature, which is shown generally as a step 24. To perform the next high speed test at the current testing temperature, the next high speed test has to be set up, i.e., the step 16 has to be executed for the next high speed test. Once the set up is complete, the step 18 of performing the next high speed test is executed. In this manner, the process of setting up a different high speed test to be performed and then performing the high speed test is continued until all of the desired high speed tests are performed at the current testing temperature. At that point, the high speed testing is complete for the current testing temperature.

The method includes a step 26 of determining whether the high speed testing is complete over the entire range of testing temperatures. That is, the step 26 determines whether the suite of high speed performance tests has been performed for each of the desired testing temperatures. If the high speed testing is not complete over the entire range of testing temperatures, the method 10 determines a different or next testing temperature, which is shown generally as a step 28. Once the new testing temperature is determined, the method returns to the step 12 of heating the module to the new testing temperature.

At the new testing temperature, the suite of high speed performance tests are performed on the transceiver module, e.g., as described hereinabove. Once all of the high speed performance tests have been performed at the new/current testing temperature, the method 10 moves to the next testing temperature, and the suite of high speed performance tests are performed at that testing temperature. After the suite of high speed tests have been performed at all of the desired testing temperatures across the range of testing temperatures, the determining step 26 determines that the testing is complete over the testing temperature range. Such is shown generally as a step 32 of the high speed performance testing being complete.

It can be appreciated that, as discussed hereinabove, setting up and performing several different high speed tests for each of a number of different temperatures across a testing temperature range can be relatively time consuming. Because of the time required to heat the transceiver to a new testing temperature and to allow the transceiver to stabilize, as well as the time required to set-up and execute each of a suite of different high speed performance tests at each testing temperature, the overall production rate, and ultimately the cost, of the transceiver modules is adversely affected. This is especially true if testing is performed on each of more than one component within the fiber optic transceiver, rather than testing the overall performance of the fiber optic transceiver as a whole.

Figure 2:
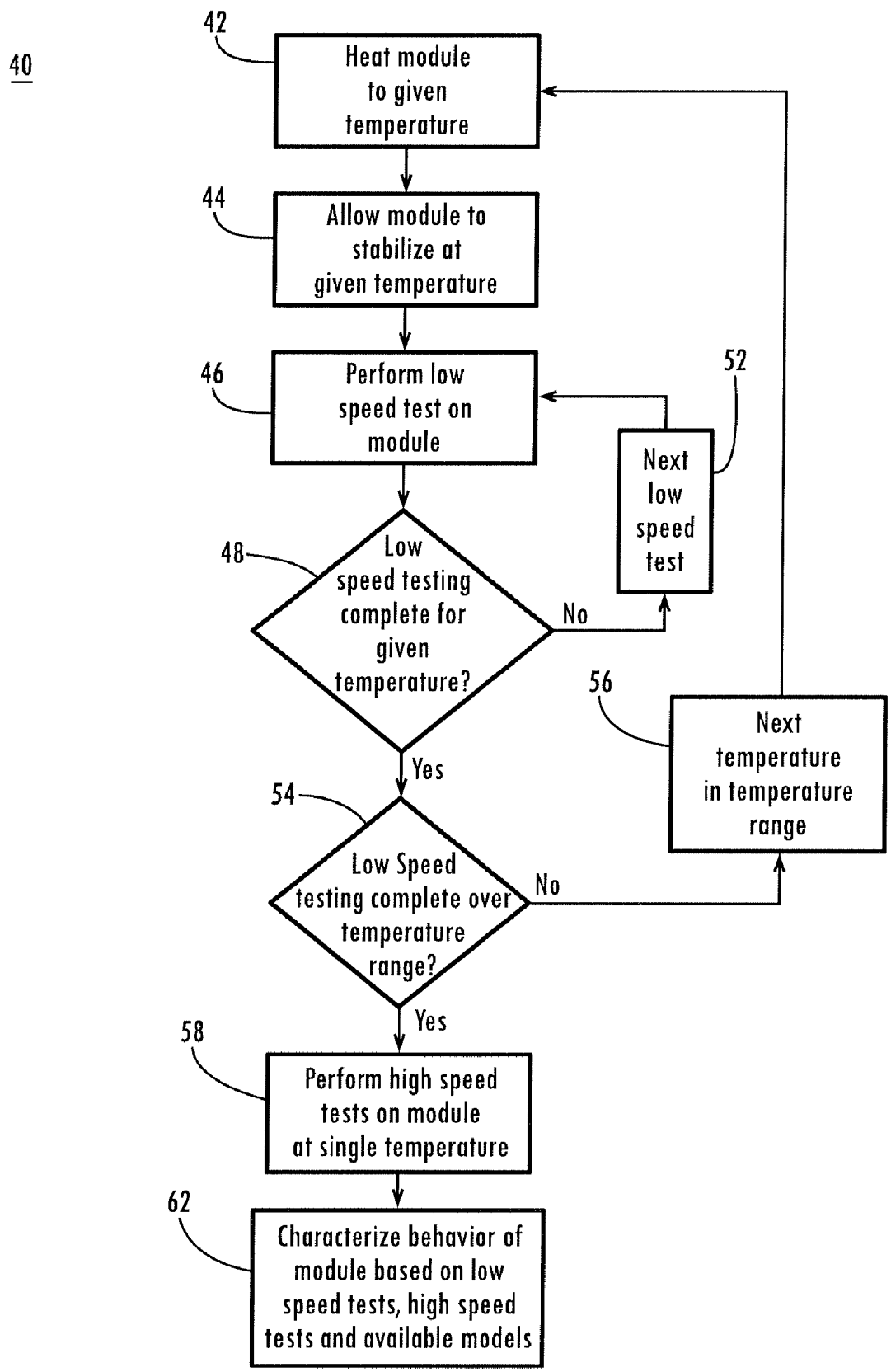
FIG. 2 is a flow chart that schematically illustrates a method for measuring the high speed performance of fiber optic transceivers and transceiver modules according to embodiments of the invention.

Referring now to FIG. 2, shown is a flow chart that schematically illustrates a method 40 for characterizing or determining the high speed performance or high speed behavior of fiber optic transceivers and transceiver modules according to embodiments of the invention. The method makes use of the fact that the high speed behavior over temperature of fiber optic transceivers often is controlled or dictated by the high speed behavior of one or more components within the fiber optic transceiver, such as the semiconductor laser optical source. The method also makes use of the fact that the high speed behavior of such components often can be determined using relatively simpler, faster performance tests (often at lower speeds) than the high speed performance tests performed in conventional methods. By combining the use of simpler, faster low speed performance tests over a range of testing temperatures with one high speed performance test at a single testing temperature within the range of temperatures, the overall high speed performance or behavior of the fiber optic transceiver can be approximated or deduced sufficiently for most purposes, including meeting customer requirements. The method 40 also can make use of measured or available modeled relationships of high speed performance characteristics of at least a portion of the transceiver to the temperature-dependent parameters measured in the low speed performance tests. In this manner, the method 40 eliminates or reduces the need to perform a relatively large number of relatively time-consuming high speed performance tests at each of several different testing temperatures.

The method 40 includes a step 42 of heating a provided fiber optic transceiver module or transceiver module component to a first testing temperature, e.g., within a desired range of transceiver module operating temperatures. For example, the heating step 42 heats the fiber optic transceiver to the lower limit or approximately the lower limit of the desired range of operating temperatures for the fiber optic transceiver. For example, for an operating temperature range of 0 to 80° C., the heating step 42 initially heats the fiber optic transceiver to a temperature near approximately 0° C.

The method 40 also includes a step 44 of allowing the heated fiber optic transceiver to stabilize at the initial testing temperature established by the heating step 42. As discussed previously herein with respect to the conventional method 10 shown in FIG. 1, a fiber optic transceiver heated to a testing temperature is given a sufficient amount of time to stabilize so that any subsequent testing will not be affected or will be minimally affected by fiber optic transceiver instability.

The method 40 also includes a step 46 of performing an initial low speed performance test on the fiber optic transceiver. It should be understood that low speed performance tests include direct current (DC) performance tests. Once the fiber optic transceiver stabilizes at the initial testing temperature, any one of several low speed performance tests is performed on the fiber optic transceiver. As will be discussed in greater detail hereinbelow, the specific low speed performance tests that can be performed can depend on the configuration or component architecture of the fiber optic transceiver. However, it should be understood that the low speed performance tests are much simpler and faster to set-up and administer than the high speed performance tests that are performed as part of conventional methods, such as the conventional method 10 shown in FIG. 1 and described hereinabove.

Once the initial low speed performance test is performed (i.e., step 46), the method 40 performs a step 48 of determining whether the low speed performance testing is complete for the current testing temperature. If one or more additional low speed performance tests are to be performed, the method 40 will move to another or next low speed performance test to be performed at the current testing temperature. Such is shown in the method 40 generally as a step 52 of moving to the next low speed performance test.

The method 40 then executes the next low speed performance test (step 46). Once that low speed performance test is complete, the method 40 determines if the low speed performance testing is complete for the current testing temperature (step 48). If not, the method 40 moves to the next low speed performance test. Such process continues until all of the low speed performance tests are completed at the current testing temperature. As will be discussed in greater detail hereinbelow, it should be understood that many low speed performance tests can be performed using the same setup. Also, many low speed performance tests can use or extract test results from the same set of test data. Therefore, in this manner, the step 52 may not require any different or additional test equipment or set up, and thus is a figurative step in the method 40.

The method 40 also includes a step 54 of determining whether the low speed performance testing is complete over the entire range of testing temperatures. If the low speed performance testing is not complete over the entire range of testing temperatures, the method 40 determines a different or next testing temperature, which is shown generally as a step 56. Once the new testing temperature is determined, the method returns to the step 42 of heating the module to the new testing temperature.

Once the fiber optic transceiver is heated to the new testing temperature (step 42) and the fiber optic transceiver has stabilized at the new testing temperature (step 44), the one or more low speed performance tests are performed on the fiber optic transceiver (or transceiver component), e.g., as described herein. Once all of the low speed performance tests are performed at the new testing temperature (steps 46, 48 and 52), the method 40 moves to the next testing temperature (step 56) and the low speed performance testing process is repeated.

As discussed hereinabove, the specific low speed performance tests to be performed on the fiber optic transceiver can depend on the components within the fiber optic transceiver and/or the specific fiber optic transceiver architecture. However, as an example, in many fiber optic transceivers, the primary cause of performance variation over temperature is the variation of the threshold current and slope efficiency of the laser light source. The threshold current is the minimum current applied to the laser for laser emission, i.e., for the laser to effectively become operational. Slope efficiency is the slope of the light output power of a device as a function of the drive current supplied to the device.

Figure 3:
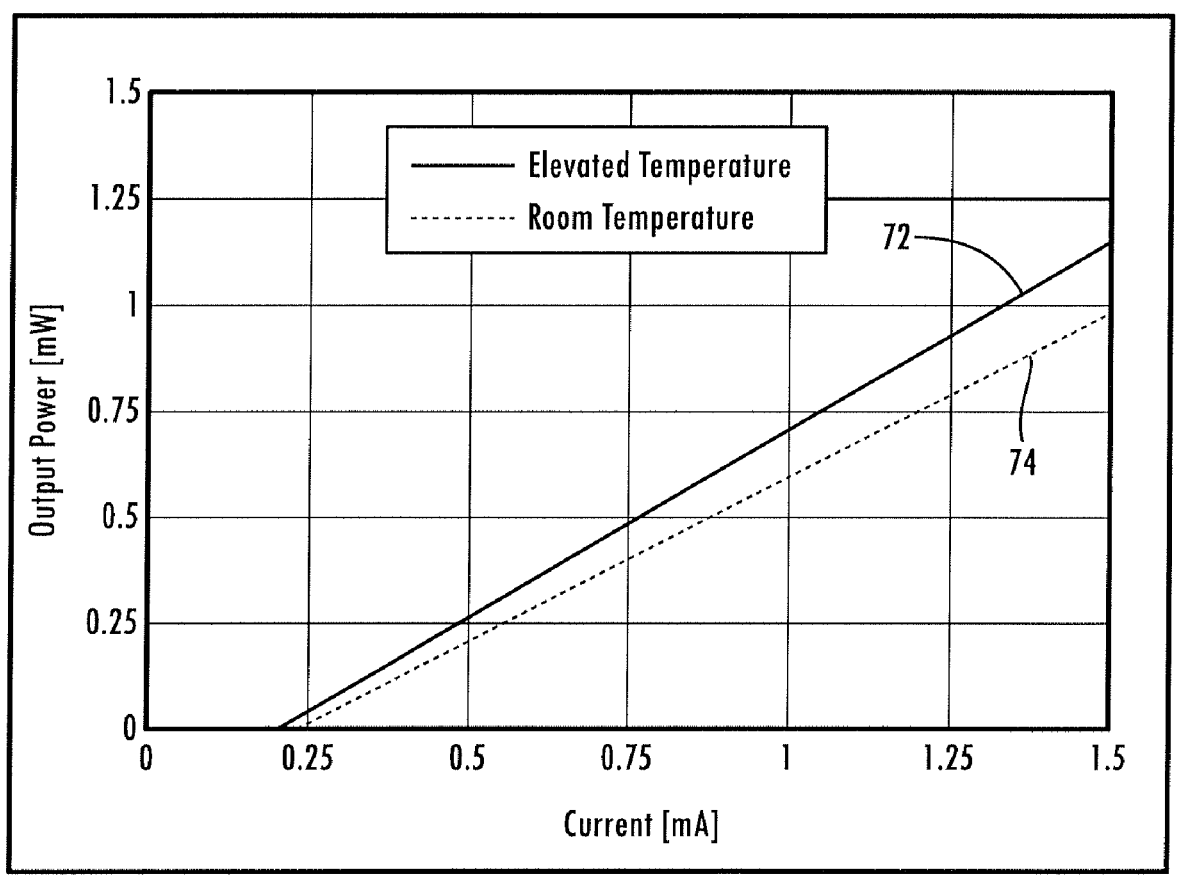
FIG. 3 is a graphical diagram of a conventional DC laser characteristic (light output power as a function of laser driver current) of a fiber optic transceiver laser light source, at room temperature and at an elevated temperature.

Referring now to FIG. 3, with continuing reference to FIG. 2, shown is a graphical diagram 70 of a conventional direct current (DC) laser characteristic, e.g., light output power as a function of laser driver current, of a laser light source, at room temperature and at an elevated temperature, e.g., approximately 90° C. Although the actual values of the threshold current and the slope efficiency will vary from transceiver device to transceiver device, the qualitative behavior of most semiconductor lasers typically is similar. For example, as the operating temperature of the laser increases, the threshold current increases and the slope efficiency decreases.

The graphical diagram 70 includes a first graph 72 of the light output power of a semiconductor laser as a function of laser drive current at room temperature, and a second graph 74 of the light output power of the same semiconductor laser as a function of laser drive current at an elevated temperature. As can be seen, at the elevated temperature, to achieve the same amount of light output power, the drive current supplied to the semiconductor laser must be greater (graph 74). Also, as can be seen, the slope of the second graph 74 (elevated temperature) is less than the slope of the first graph 72 (room temperature). Thus, as the temperature increases, the slope efficiency of the device decreases.

The measurement of light output power as a function of drive current, and other DC laser characteristics, typically are made at several different temperatures over the range of transceiver operating temperatures, as discussed hereinabove. Also, theoretical models are available that characterize how the speed and other high speed characteristics of the semiconductor laser depend on various parameters that are measured during the low speed performance tests. For example, theoretical models are available that characterize how the speed of the semiconductor laser depends on the threshold current supplied thereto and the slope efficiency of the laser. Such models often are available, e.g., as part of the testing of the various individual transceiver components themselves.

According to embodiments of the invention, with a single set of measurements from a high speed performance test at a single temperature within the range of the transceiver operating temperatures, along with the low speed performance test measurements over the range of the transceiver testing/operating temperatures, the available models can be used to predict how the high speed behavior of the laser will behave over the range of transceiver operating temperatures. Furthermore, to the extent that the high speed performance of the transceiver is dominated or controlled by the high speed performance of the laser source, the high speed performance of the transceiver can be characterized.

Returning to FIG. 2, the method 40 includes a step 58 of performing a high speed performance test suite on the fiber optic transceiver at a single temperature within the range of transceiver operating temperatures. The high speed performance test suite can be any suitable high speed tests that measure one or more high speed performance characteristics of the transceiver. For example, as discussed hereinabove, the high speed performance test suite can include one or more BER tests. Alternatively, the high speed performance test suite can include one or more small signal frequency response tests.

The method 40 also includes a step 62 of determining or characterizing the high speed performance of the transceiver. The determining step 62 uses the measurements from the low speed performance tests over temperature (steps 46, 48, 52) to characterize how parameters important to high speed performance of the transceiver depends on temperature. The determining step 62 also uses measured or available modeled relationships of high speed performance characteristics of at least a portion of the transceiver to the temperature-dependent parameters measured in the low speed performance tests. Using the measurements from the single high speed performance test at a single temperature (step 58), the determining step 62 can predict, e.g., via calculation or approximation, the high speed performance of at least a portion of the transceiver. To the extent that the high speed performance of at least a portion of the transceiver dominates or otherwise determines the high speed performance of the overall transceiver, the determining step 62 determines the high speed performance of the overall transceiver. For example, the high speed performance of the transceiver often can be predicted sufficiently for purposes of meeting customer specifications.

Although some of the examples discussed hereinabove involve the behavior of semiconductor lasers, which are used as light sources in fiber optic transceivers, the inventive methods described herein are suitable for use with other components within a fiber optic transceiver, such as one or more transmitter module integrated circuits and/or one or more receiver module integrated circuits. As discussed, using their measured or available modeled relationships of high speed performance characteristics to the temperature-dependent parameters measured in the low speed performance tests, along with the results of the low speed performance test over temperature and the single high speed performance test at a single temperature, their high speed performance over temperature can be deduced. The high speed performance of the transceiver then can be determined based on the effect of the high speed performance of the one or more transceiver components.

It should be noted that the accuracy of the results of the inventive methods described herein can be affected by the level or amount of available or measured knowledge of the behavior of various components in the fiber optic transceiver. In this manner, the approximated performance characteristics resulting from the inventive methods described herein may not be as accurate as conventional methods that perform a full suite of high speed performance tests for several testing temperatures across the range of transceiver operating temperatures. However, the inventive methods described herein can result in relatively significant cost savings, e.g., in terms of production time and necessary test equipment, while still meeting customer requirements.

It will be apparent to those skilled in the art that many changes and substitutions can be made to the methods for measuring the high speed performance or behavior of fiber optic transceivers and transceiver modules herein described without departing from the spirit and scope of the invention as defined by the appended claims and their full scope of equivalents.

The invention claimed is:

1. A method for measuring the high speed behavior of a fiber optic transceiver, comprising the steps of:
    providing a fiber optic transceiver;
    performing at least one low speed performance test on the fiber optic transceiver at a first temperature;
    performing at least one low speed performance test on the fiber optic transceiver at at least one second temperature, wherein the first temperature and the at least one second temperature define a testing temperature range;
    performing at least one high speed performance test on the fiber optic transceiver at a single temperature within the testing temperature range; and
    determining the high speed behavior of the fiber optic transceiver based on the plurality of low speed performance tests and the at least one high speed performance test.

2. The method as recited in claim 1, wherein the determining step also is based on the relationship of at least one high speed performance characteristic of at least a portion of the transceiver to at least one testing parameter measured as part of at least one low speed performance test.

3. The method as recited in claim 1, wherein the at least one low speed performance test measures how one or more performance characteristics of the fiber optic transceiver depends on changes in temperature.

4. The method as recited in claim 1, wherein the at least one high speed performance test measures how one or more high speed performance characteristics of the fiber optic transceiver depends on changes in temperature.

5. The method as recited in claim 1, wherein the determining step includes determining the relationship of one or more performance characteristics of the fiber optic transceiver to the high speed performance of the fiber optic transceiver.

6. The method as recited in claim 1, wherein the determining step includes determining the relationship of the performance characteristics of at least one component in the transceiver to the performance characteristics of the fiber optic transceiver.

7. The method as recited in claim 1, wherein the at least one low speed performance test includes determining the direct current (DC) behavior of the fiber optic transceiver.

8. The method as recited in claim 1, wherein the low speed performance test includes performing at least one low speed performance test on at least one component within the fiber optic transceiver.

9. The method as recited in claim 1, wherein the low speed performance test includes measuring at least one DC characteristic of at least one component within the fiber optic transceiver.

10. The method as recited in claim 1, wherein the fiber optic transceiver includes a semiconductor laser optical source, and wherein the at least one low speed performance test measures at least one of a threshold current and a slope efficiency of the semiconductor laser optical source.

11. The method as recited in claim 1, wherein the at least one high speed performance test includes a high speed performance test selected from the group consisting of a Bit Error Ratio (BER) test, a small signal frequency response test, a jitter test and a drive current test.

12. The method as recited in claim 1, wherein the fiber optic transceiver includes a laser light source, at least one transmitter module integrated circuit and at least one receiver module integrated circuit, and wherein the low speed performance test includes performing at least one low speed performance test on at least one of the laser light source, the transmitter module integrated circuit and the receiver module integrated circuit.

13. The method as recited in claim 1, wherein the at least one high speed performance test includes performing a high speed performance test on at least one component within the fiber optic transceiver.

* * * * *